Patented Sept. 20, 1949

2,482,088

UNITED STATES PATENT OFFICE 2,482,088

ADDUCT OF BUTADIENE SULFONE AND BROMOTRICHLOROMETHANE AND PROCESS OF PARTIAL DEHALOGENATION THEREOF

Morris S. Kharasch, Chicago, Ill., assignor to United States Rubber Company, New York, N. Y., a corporation of New Jersey No Drawing. Application October 25, 1947,
Serial No. 782,217

4 Claims. (Cl. 260—329)

This invention has to do with certain new halogen containing derivatives of butadiene sulfone and with methods for their preparation.

I have found that trichlorobromomethane adds to butadiene sulfone under free radical reaction conditions to yield a new halogen containing derivative which is a crystalline solid with a melting point between 141 and 142° C. and contains in one molecule the constituent atoms from one molecule of butadiene sulfone and the constituent atoms from one molecule of trichlorobromomethane. The product is therefore a one to one adduct of butadiene sulfone and trichlorobromomethane. On the basis of present experimentation this adduct appears to have the formula

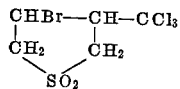

The reaction between the trichlorobromomethane and the butadiene sulfone may be initiated by irradiating the reaction mixture with actinic light or by thermally decomposing a diacyl peroxide within the reaction mixture, or with other suitable means of generating free radicals.

The reaction mixture employed should contain at least a molar excess of trichlorobromomethane and the best results will be obtained when the molar ratio of trichlorobromomethane to butadiene sulfone is at least three to one. Lower ratios may however be used. When a diacyl peroxide is employed as the free radical initiator, the amount employed should be between one and five mol percent, although more or less may be used. The best results are obtained when the initiator is added in portions throughout the course of the reaction. The reaction may be carried out at temperatures between 50° C. and 120° C. depending upon the peroxide used as the initiator. In most cases the preferred range is between 70° C. and 90° C. At lower temperatures the rate of reaction is low. At very high temperatures there may be some decomposition of the adduct leading to lower yields of the desired product.

The fact that trichlorobromomethane adds to butadiene sulfone to form a product having the structure

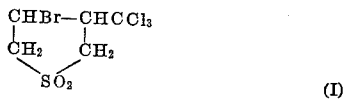

is most unexpected since under similar reaction conditions the analogous tetrahalomethane, carbon tetrachloride, reacts with butadiene sulfone to give the compound $CCl_3CH_2-CH=CH-CH_2Cl$ (cf. U. S. 2,401,099).

The free radical initiated reaction between trichlorobromomethane and butadiene sulfone to form a product having structure (I) may be illustrated by the following equations:

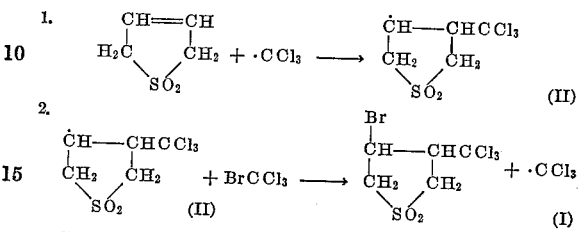

Equation 1 illustrates the addition of a free trichloromethyl radical to butadiene sulfone to form the radical (II). Equation 2 illustrates the reaction in which the free radical (II) removes a bromine atom from a molecule of trichlorobromomethane to form the product (I) and generate a free trichloromethyl radical which can participate in reaction 1 and carry on the chain reaction.

The following equations illustrate suitable methods of generating the free trichloromethyl radicals necessary to initiate reaction 1.

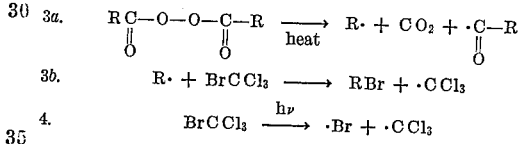

Equation 3a illustrates the thermal decomposition of a diacyl peroxide to form free radicals which can remove a bromine atom from a molecule of trichlorobromomethane as in Equation 3b to generate a free trichloromethyl radical. Equation 4 illustrates the photochemical decomposition of trichlorobromomethane to generate free trichloromethyl radicals. It should be apparent from a consideration of these equations that the course of reactions 1 and 2 and the nature of the product formed are independent of the way in which the trichloromethyl radicals are formed.

The new chemical compound, 3-bromotetrahydro-4-trichloromethylthiophene - 1,1 - dioxide formed by the free radical initiated addition of trichlorobromomethane to butadiene sulfone (also known as 2,5-dihydrothiophene-1-dioxide) can be dehydrohalogenated to give a new halogenated, unsaturated crystalline derivative of butadiene sulfone having a melting point of 110.5° C. to 111.5° C. and the structure

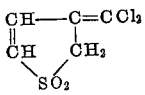

The ultra-violet absorption spectra of this substance indicates the presence of a conjugated system of double bonds. Both 3-bromotetrahydro-4-trichloromethylthiophene-1,1-dioxide and its partially dehydrohalogenated derivative, 3-dichloromethylene - 2,3 - dihydrothiophene - 1,1-dioxide, are useful intermediates in the preparation of dyes, perfumes, pharmaceuticals and resins and are useful as insecticides.

The following examples are illustrative of my invention:

*Example 1*

Butadiene sulfone, 35 grams, M. P. 64–65° C. is added to 268 grams of $CCl_3Br$ and to this mixture there is added (in five equal portions at ½ hour intervals) a solution of 3.4 grams of diacetyl peroxide dissolved in 16 cc. of $CCl_3Br$. The temperature of the reaction mixture is maintained at 80–85° C. during the addition of the peroxide solution and for an additional one-half hour (total reaction time is three hours). There is obtained 43 grams of the 1:1 adduct of $CCl_3Br$ as a crystalline solid which when purified melts at 141–142° C. An additional 3.6 grams can be obtained from the mother liquor.

*Analysis.*—Calc'd for $C_5H_6O_2SBrCl_3$: percent S, 10.1; mol. wt., 316. Found: percent S, 10.0; mol. wt., 312.

The structure of this compound is therefore considered to be

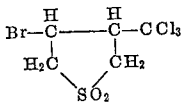

*Example 2*

A solution of 11.8 grams (0.1 mol) of butadiene sulfone M. P. 65.5–66.5° C. in 297.5 grams (1.5 mol) of $CCl_3Br$ is placed in a glass apparatus containing a spiral neon fluorescent lamp. The air in the reaction vessel is displaced with nitrogen and the light is turned on for twelve hours during which time the temperature rises to about 50° C. There is obtained 14 grams of a crystalline product chemically identical with the product of Example 1.

*Example 3*

To 2.75 grams of the one to one adduct from Example 1 dissolved in ethyl alcohol at 35° C. there is added 2 drops of phenolphthalein and the solution is titrated with .45 KOH solution to the color change. This requires two moles of KOH per mol of 1:1 adduct. At the end of fifteen minutes the mixture is filtered and 1.5 grams of salt is recovered. The calculated amount of KBr and KCl formed should be 1.65 grams. The filtrate is concentrated to 10 cc. and 1.45 grams of a crystalline material having a M. P. 110.5–111.5° C. is obtained. Further purification of this product by recrystallization does not change its melting point. The crystalline product decolorizes a dilute potassium permanganate solution. The cryoscopic molecular weight in benzene of the product is 203. The calculated molecular weight for the compound

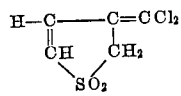

is 199.

*Analysis.*—Calc'd for $C_5H_4O_2SCl_2$: percent Cl=35.6. Found: percent Cl=35.4.

I claim:

1. The chemical compound, 3-bromo-tetrahydro-4-trichloromethylthiophene-1,1-dioxide.

2. The process of manufacturing a polyhalogeno thiophene dioxide derivative which comprises subjecting butadiene sulfone and trichlorobromomethane to the action of a peroxy polymerization initiator until said polyhalogeno thiophene dioxide derivatives are formed and isolating said derivatives.

3. The process of manufacturing 3-bromo-tetrahydro-4-trichloromethylthiophene-1,1 - dioxide which comprises maintaining butadiene sulfone and trichlorobromomethane in contact with a diacyl peroxide until said 3-bromo-tetrahydro-4-trichloromethylthiophene-1,1-dioxide is formed and separating said product.

4. The process of manufacturing 3-dichloromethylene - 2,3 - dihydrothiophene - 1,1 - dioxide which comprises maintaining butadiene sulfone and trichlorobromomethane in contact with a diacyl peroxide until 3-bromo-tetrahydro-4-trichloromethylthiophene - 1,1 - dioxide is formed, separating said 3-bromo-tetrahydro-4-trichloromethylthiophene-1,1-dioxide and maintaining it in contact with an aqueous solution containing an alkali metal hydroxide until said 3-dichloromethylene-2,3-dihydrothiophene - 1,1 - dioxide is formed.

MORRIS S. KHARASCH.

REFERENCES CITED

The following references are of record in the file of this patent:

UNITED STATES PATENTS

| Number | Name | Date |
|---|---|---|
| 2,398,430 | Joyce | Apr. 16, 1946 |
| 2,401,099 | Peterson | May 28, 1946 |